United States Patent
Epple et al.

(10) Patent No.: US 8,457,851 B2
(45) Date of Patent: Jun. 4, 2013

(54) METHOD AND DEVICE FOR CONTROLLING THE BRAKING SYSTEM OF A VEHICLE

(75) Inventors: Stefan Epple, Moeglingen (DE); Jochen Wagner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 627 days.

(21) Appl. No.: 12/225,651

(22) PCT Filed: Mar. 23, 2007

(86) PCT No.: PCT/EP2007/052792
§ 371 (c)(1),
(2), (4) Date: Jul. 16, 2010

(87) PCT Pub. No.: WO2007/113134
PCT Pub. Date: Oct. 11, 2007

(65) Prior Publication Data
US 2010/0280723 A1 Nov. 4, 2010

(30) Foreign Application Priority Data
Apr. 3, 2006 (DE) .......................... 10 2006 015 483

(51) Int. Cl.
G06G 7/00 (2006.01)
B60T 8/34 (2006.01)

(52) U.S. Cl.
USPC .................. 701/70; 303/113.1; 303/113.3

(58) Field of Classification Search
None
See application file for complete search history.

(56) References Cited

U.S. PATENT DOCUMENTS
4,738,112 A * 4/1988 Nomura et al. .................. 60/721
6,328,389 B1 * 12/2001 Yotsuya et al. ............ 303/113.3

FOREIGN PATENT DOCUMENTS
DE 195 01 760 7/1996
DE 195 24 939 1/1997
DE 197 39 152 3/1999
JP 2002145044 A * 5/2002

* cited by examiner

Primary Examiner — Khoi Tran
Assistant Examiner — Robert Nguyen
(74) Attorney, Agent, or Firm — Kenyon & Kenyon LLP

(57) ABSTRACT

In a method and a device for controlling the braking system of a vehicle having a vacuum brake booster and a vacuum source, it is provided that a variable triggering threshold value, at the exceeding of which an automatic braking procedure is triggered, is a function of the vacuum level or of the vacuum gradient of the vacuum brake booster.

16 Claims, 3 Drawing Sheets

METHOD AND DEVICE FOR CONTROLLING THE BRAKING SYSTEM OF A VEHICLE

BACKGROUND OF THE INVENTION

1. Field of the Invention

The present invention relates to a method and a device for controlling the braking system of a vehicle having a vacuum brake booster and a vacuum source.

2. Description of Related Art

It is known from published German patent document DE 195 24 939 that one may control the braking system of a vehicle in such a way that, in certain operating situations, the brake force is built up beyond the actual driver specification at the wheel brake. Such an operating situation exists, for example, when the driver operates the brake pedal very rapidly. The operation of the brake pedal results in a change in the admission pressure, that is, the pressure that exists at the output of the main brake cylinder. Therefore, it is checked at one control unit whether the change in the admission pressure caused by the brake pedal operation is exceeding a certain threshold. When the triggering threshold is exceeded, an automatic braking procedure (emergency or panic braking) is triggered. For the improvement of the triggering criterion it is provided that one should select the threshold value as a function of different operating variables, such as, for instance, the admission pressure level, the vehicle speed or the vehicle rotation rate.

It is also known from published German patent document DE 197 39 152 that one may determine the triggering threshold value as a function of the currently present braking phase. In this context, a control unit decides whether there is an initial braking phase or an ongoing braking process. Different characteristics curves are drawn upon to determine correction factors, depending on the braking phase.

It is true that the known design approaches yield satisfying methods and devices for determining a triggering threshold value which is used for triggering an automatic braking procedure. However, it turns out that the determination of the threshold value does not take into account all the important operating variables. In the case of highly dynamic pedal operation, that is, for instance, during cadence braking, the admission pressure that sets in after a brake pedal operation, that is, the admission pressure level and the resulting admission pressure gradient, fall off with an increasing number of brake pedal operations. If the control unit uses the gradient of the admission pressure and/or the admission pressure level as the signal characterizing the operation of the brake pedal, this has the result that, after a large number of pedal actuations, a specified triggering threshold value is no longer able to be exceeded, with the result that an emergency brake situation is no longer reliably detected.

BRIEF SUMMARY OF THE INVENTION

An object of the present invention is to provide a method and a device by the use of which an emergency braking situation is reliably detected even after a plurality of highly dynamic pedal operations.

The present invention is based on the idea of determining the triggering threshold value, at whose exceeding an automatic braking procedure is initiated, as a function of the vacuum level or the vacuum gradient of the vacuum brake booster. After each braking procedure the vacuum present at the vacuum brake booster or the vacuum in the brake booster falls off. The reduction in the vacuum results in considerable functional forfeits in the brake booster, whereby the admission pressure setting in response to a subsequent brake pedal actuation and the admission pressure gradient are significantly less than during the previous brake pedal actuation. Because the triggering threshold value takes into account the vacuum fluctuations of the vacuum brake booster and/or in a vacuum supply line of the vacuum brake booster, the triggering threshold value also falls off when the vacuum falls off. Hereby the triggering sensitivity remains the same for the driver, independently of whether the brake pedal is actuated several times consecutively, especially highly dynamically, or whether the brake pedal is operated only once. Based on the present invention, the so-called braking assistance function is assured even after a large number of consecutive brake pedal actuations.

The intake pipe system of an internal combustion engine comes into consideration, for example, as the vacuum source for the vacuum brake booster, or a vacuum pump which is driven either by an electric motor or by the internal combustion engine.

In one refinement of the present invention, it is provided that a correction factor be ascertained by a control unit, as a function of the vacuum in the vacuum brake booster, that is multiplied by a specified basic triggering threshold value in order to determine the triggering threshold. This correction factor is preferably between 0 and 1.

According to one advantageous example embodiment of the present invention, it is provided that at least one sensor is provided for measuring the vacuum level in the vacuum brake booster and/or in a vacuum supply line of the vacuum brake booster. Preferably, vacuum brake boosters in a two-chamber construction or in a four-chamber construction are used.

According to one alternative example embodiment it is provided not to measure the vacuum level using a sensor, but rather to estimate it approximately, particularly using a microcomputer, with the aid of at least one operating variable having an influence upon the vacuum and/or with the aid of at least one operating variable that is influenced by the vacuum.

As the operating variable for ascertaining the vacuum, one may take into account the curve of the brake pedal actuation over time, especially the number of brake actuations within a time interval, if necessary, in consideration of the intensity of the brake pedal actuations. For this purpose, for instance, the pressure fluctuations of the admission pressure may be counted and possibly the admission pressure level may be taken into account. The greater the number of the brake pedal actuations within a time interval, the less is the vacuum in the brake booster. The vacuum level falls off faster at forceful brake pedal actuations, that is, at high admission pressures.

One may also take into account an ABS state variable (ABS) and/or the rotational speed of the vehicle's engine (nMot) and/or the gas pedal setting (PW) and/or a signal (VacValid) that ensures the function of the vacuum source. The influence of the operating variables on the vacuum level or the vacuum level on the operating variables may be determined, for example, using a characteristics curve model.

The determination of the vacuum at the vacuum brake booster, by measuring or by ascertaining with the aid of operating variables, may additionally be used to control the supply of the vacuum brake booster with vacuum. For example, when a minimum vacuum is undershot, a vacuum reservoir may be activated with the aid of which the original vacuum level in the vacuum brake booster is able to be reconstituted in the shortest period of time.

The device according to the present invention includes a microcomputer, with the aid of which the vacuum level or the vacuum gradient of the vacuum brake booster may be taken into account in the determination of the triggering threshold value. Either the actual vacuum level is supplied to the microcomputer or the microcomputer ascertains the vacuum level with the aid of operating variables. A characteristics curve or an appropriate polynomial is specified for the determination of a correction factor as a function of the vacuum. The characteristics curve or the polynomial are able to be ascertained by vehicle tests, test stand experiments and also by simulations.

DETAILED DESCRIPTION OF THE INVENTION

Figure 1:
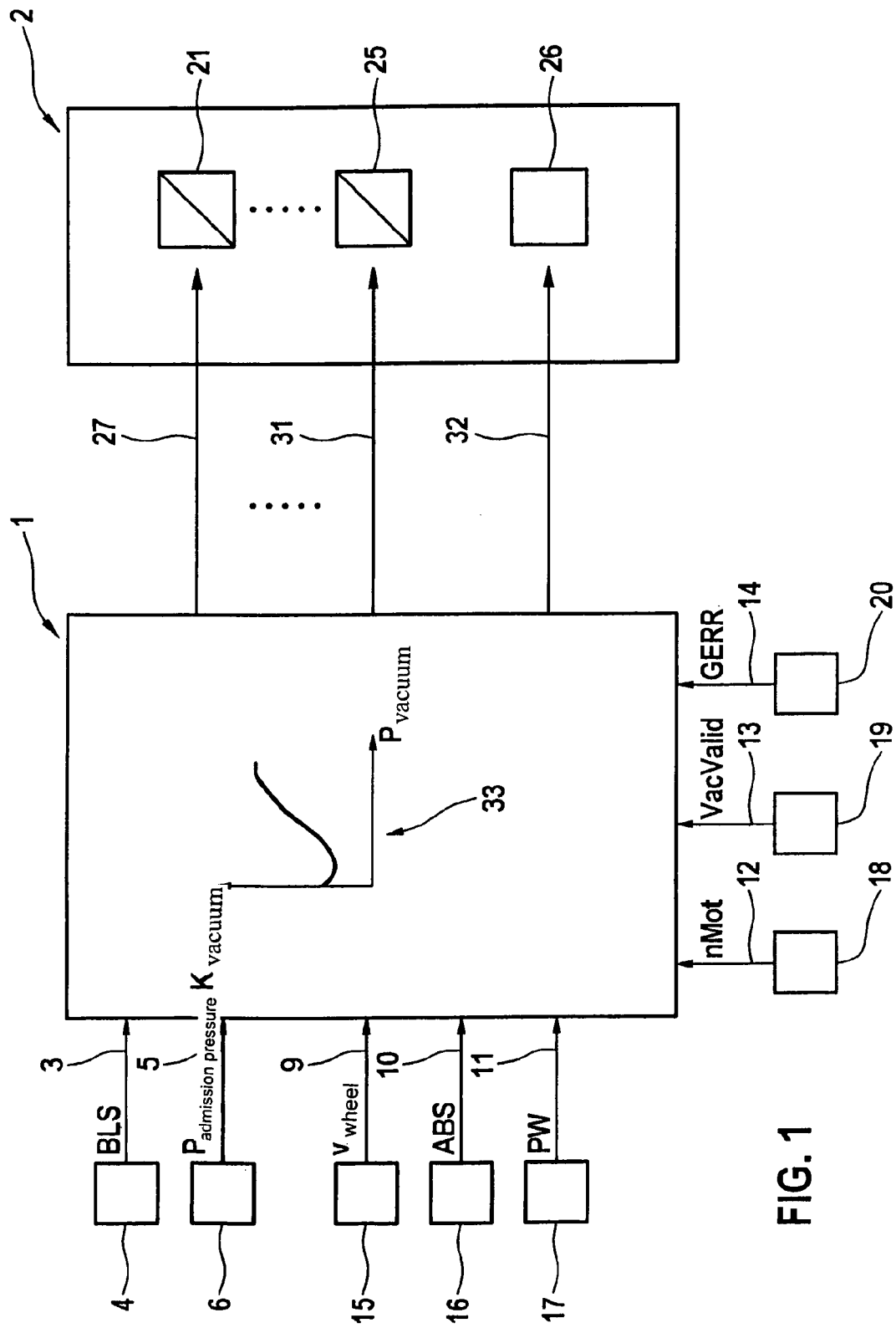
FIG. 1 shows a block diagram of a control device for a braking system of a vehicle, in which the vacuum $P_{vacuum}$, ascertained with the aid of operating variables, is taken into account in the ascertainment of a correction factor for the triggering threshold value.

In the figures, the same components and components having the same function are designated by the same reference numerals.

FIG. 1 shows an electronic control unit 1 having at least one microcomputer. Control unit 1 controls a braking system 2 that is known from the related art, for instance, from published German patent document DE 195 01 760. Operating variables of the vehicle are supplied to control unit 1 via various input lines. A first input line 3 connects control unit 1 to a brake pedal switch 4, which generates a signal BLS that characterizes a brake pedal actuation. A second input line 5 connects at least one sensor 6 for recording the admission pressure $P_{Vor}$ in braking system 2, that is, the pressure present at the output of the main brake cylinder in braking system 2. Alternatively or additionally to this, sensor 6 or further sensors record additional operating signals, such as the operating force of the brake pedal, the torque exerted upon the brake pedal, or the path covered by the brake pedal. The number of brake pedal actuations in a specified time interval is counted using control unit 1. Taking into account the intensity of the brake pedal actuations, that is, the magnitude of admission pressure $P_{Vor}$, control unit 1 draws conclusions on vacuum $P_{vacuum}$ in the brake booster or in a vacuum supply line, using characteristics curve models.

Further operating variables of the vehicle are supplied to the control unit, as required, by measuring devices 15 to 20 via input lines 9 to 14. For example, control unit 1 receives signals from measuring device 15 via input line 10, from which wheel speeds $V_{Rad}$ of the wheels of the vehicle may be derived. Additional input variables are formed by an ABS state variable (ABS), the engine speed of the driving engine of the vehicle (nMot), accelerator setting (PW) and a signal that ensures the function of the vacuum source (VacValid). These operating variables may flow alternatively or cumulatively into the determination of the vacuum $P_{vacuum}$.

Hydraulic braking system 2 has electrically controllable valves 21 to 25 and pumps 26, which are able to be controlled by control unit 1 via its output lines 27 to 31. By the operation of pumps and valves, pressure is built up and reduced in targeted fashion at the individual wheel brakes of the vehicle, independently of the driver, particularly during the execution of an automatic braking procedure.

Besides an antilock function and perhaps an antislip control and/or a driving dynamics control, control unit 1 has a so-called brake-assist system which, on the basis of operating signals for the brake pedal, detects an operating situation in which the driver desires to have a very great braking force at the wheel brakes, and executes an automatic braking procedure when this situation is presented. The detection of the operating situation takes place by a comparison of the at least one actuating signal of the brake pedal to a specified triggering threshold value. In the preferred exemplary embodiment, the change $DP_{Vor}$ of the admission pressure of braking system 2 is selected as the criterion for the triggering of the automatic braking procedure, at which braking force is built up at the wheel brakes via the specification exerted by the driver on braking system 2. Alternatively or additionally, the operating signals mentioned above may be used.

According to the present invention, control unit 1 modifies the triggering threshold value as a function of vacuum $P_{vacuum}$ of the vacuum brake booster ascertained approximately with the aid of operating variables, preferably in such a way that the triggering threshold value decreases when the vacuum level $P_{vacuum}$ decreases. The triggering of the automatic braking procedure thus becomes more sensitive with decreasing vacuum $P_{vacuum}$. The triggering threshold value is calculated using the example of a threshold value for admission pressure change $DP_{Vor}$, in the microcomputer of control unit 1, as follows:

$$A = K_{Vacuum} * A_{basic}$$

where
A: triggering threshold value
$A_{basic}$: basic triggering threshold value
$K_{Vacuum}$: correction factor, a function of the vacuum level A characteristics curve 33 or an appropriate polynomial is defined for the influence of vacuum $P_{vacuum}$, which forms correction $K_{vacuum}$ that is a function of the admission pressure.

Figure 2:
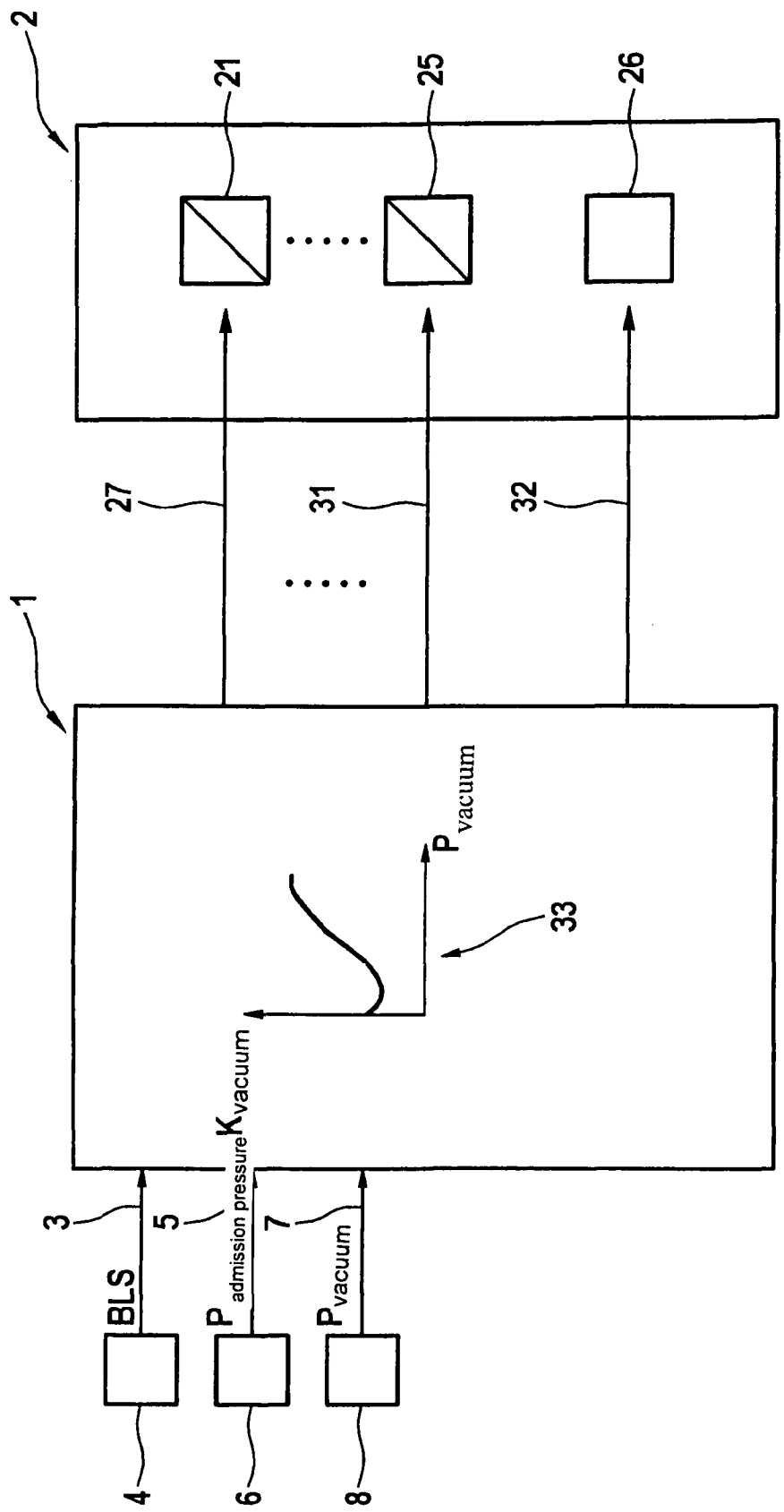
FIG. 2 shows a block diagram of an alternative control device for a braking system of a vehicle, in which the actually measured vacuum $P_{vacuum}$ is taken into account in the ascertainment of a correction factor for the triggering threshold value.

FIG. 2 shows an alternative electronic control unit 1. Braking system 2 corresponds to braking system 2 shown in FIG. 1. In contrast to the control unit shown in FIG. 1, control unit 1 shown in FIG. 2 is connected via input line 7 to a measuring sensor 8, which measures vacuum $P_{vacuum}$ in the vacuum brake booster and/or in a vacuum supply line. With the aid of this actual value, correction factor $K_{vacuum}$ and triggering threshold value A are ascertained as explained above. Only the step of determining vacuum $P_{vacuum}$ with the aid of operating variables is omitted. Other than that, the function is identical to the control unit shown in FIG. 1. In addition, further operating variables may be taken into account in ascertaining correction factor $K_{vacuum}$ and triggering threshold value A.

Figure 3:
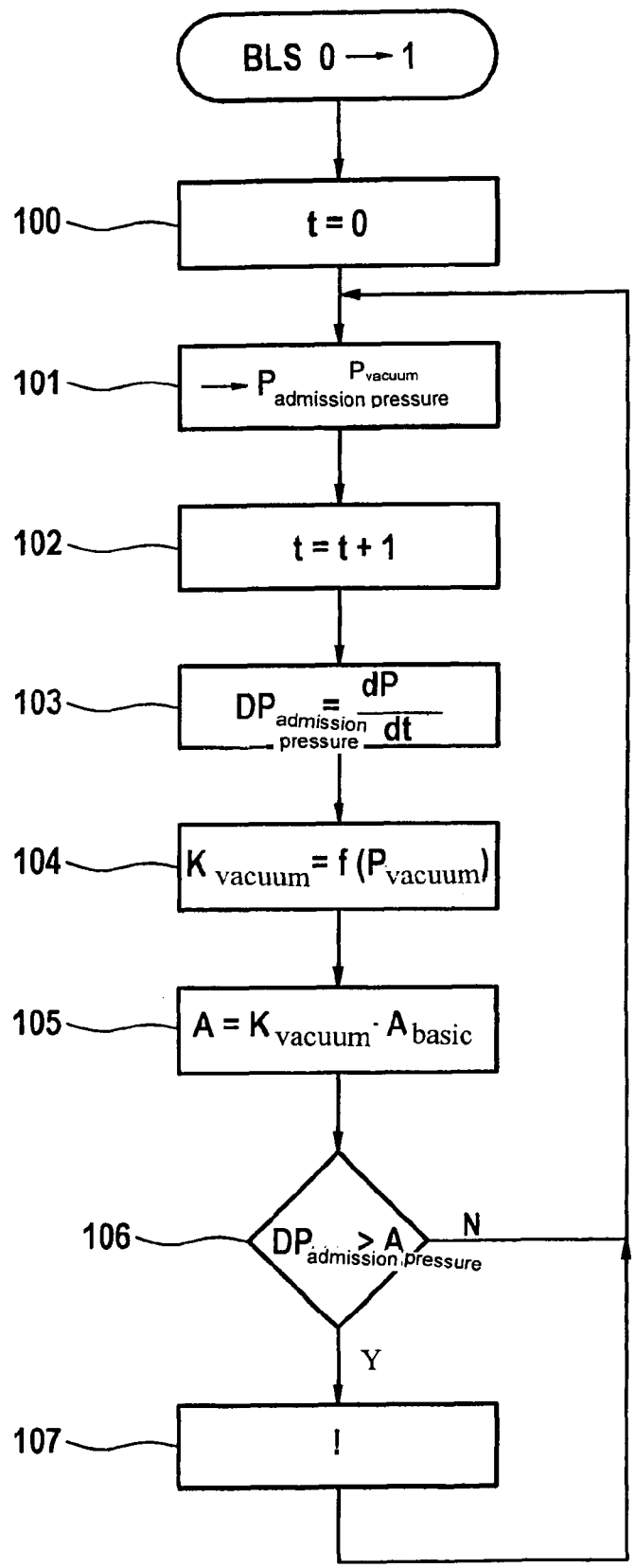
FIG. 3 shows a simplified flow chart that represents a program of a microcomputer, with the aid of which the triggering threshold value is determined on the example of a threshold value for the admission pressure change.

One exemplary embodiment is shown with the aid of the flow chart in FIG. 3, using the example of a vacuum-dependent triggering threshold for the admission pressure gradient. It shows a program of the at least one microcomputer of control unit 1 which is started with a change in signal BNS from 0 to 1, that is, when the driver operates the brake pedal. Thereupon, the operating time counter is incremented in a preliminary step 100.

In a first step 101, admission pressure $P_{Vor}$ and vacuum $P_{vacuum}$ at or in the vacuum brake booster, as well as possibly further operating variables are read in. Vacuum $P_{vacuum}$ may be ascertained approximately, in a program step that is not shown, with the aid of operating variables, or a measured value of the actual vacuum is drawn upon for the further calculation. In second step 102, operating time counter t is increased by a time step or counting step. In third step 103, based on recorded admission pressure $P_{Vor}$ and an admission pressure value from a previous program run, admission pressure gradient $DP_{Vor}$ is determined while taking into account the operating counter state. This is done, for example, as taking the derivative with respect to time of admission pressure $P_{Vor}$, or based on subtraction. In step 104, vacuum-dependent correction factor $K_{vacuum}$ is determined with the aid of a characteristics curve 33, for example. Additional operating variables might possibly be considered.

In fifth step 105, triggering threshold value A is determined with the aid of correction factor $K_{vacuum}$, as well as a basic triggering threshold value $A_{basic}$.

In subsequent querying step 106, admission pressure gradient $DP_{Vor}$ is compared to triggering threshold value A. If admission pressure gradient $DP_{Vor}$ exceeds triggering threshold value A, an automatic braking procedure is carried out according to step 107, while controlling pumps 26 and valves 21 to 25. If admission pressure gradient $DP_{Vor}$ does not exceed triggering threshold value A, the program is repeated with step 101. If an ending criterion for the automatic braking procedure is satisfied in step 107, for instance, if the admission pressure falls below a specified threshold value, the program is also repeated with step 101. If the driver releases the brake pedal, the program is ended.

What is claimed is:

1. A method for controlling a braking system of a vehicle having a vacuum brake booster and a vacuum source, comprising:
    determining, by a computer processor, a correction factor for a threshold value as a function of one of a magnitude of a vacuum level and a vacuum gradient of the vacuum brake booster;
    comparing, by the processor, one of a signal characterizing an operation of a brake pedal by a driver of the vehicle and a variable derived from the signal characterizing the operation of the brake pedal to the threshold value; and
    triggering, by the processor, an automatic braking procedure if the one of the signal characterizing the operation of the brake pedal and the variable derived from the signal exceeds the threshold value.

2. The method as recited in claim 1, wherein the signal characterizing the operation of the brake pedal or the variable derived from the signal is one of a gradient of an admission pressure of the vacuum brake booster or an admission pressure level of the vacuum brake booster.

3. The method as recited in claim 1, wherein the correction factor decreases as the vacuum level decreases.

4. The method as recited in claim 1, further comprising:
    determining the threshold value as a function of at least one of the vacuum level and the vacuum gradient; and
    subsequently modifying the determined threshold value by the correction factor.

5. The method as recited in claim 1, where a value of the correction factor is any value in a range between and including 0 and 1.

6. The method as recited in claim 2, wherein the vacuum level of the vacuum brake booster is measured in one of the vacuum brake booster and a vacuum supply line of the vacuum brake booster.

7. The method as recited in claim 2, wherein the vacuum level of the vacuum brake booster is at least approximately ascertained with the aid of at least one of an operating variable having an influence on the vacuum level and an operating variable influenced by the vacuum level.

8. The method as recited in claim 7, wherein the vacuum brake booster is supplied with vacuum from an additional vacuum source as a function of the vacuum level of the vacuum brake booster.

9. A method for controlling a braking system of a vehicle having a vacuum brake booster and a vacuum source, comprising:
    comparing, by a computer processor, one of a signal characterizing an operation of a brake pedal by a driver of the vehicle and a variable derived from the signal characterizing the operation of the brake pedal to a threshold value; and
    triggering, by the processor, an automatic braking procedure if the one of the signal characterizing the operation of the brake pedal and the variable derived from the signal exceeds the threshold value;
    wherein:
        the threshold value is specified at least partially as a function of at least one of a vacuum level and a vacuum gradient of the vacuum brake booster;
        the signal characterizing the operation of the brake pedal or the variable derived from the signal is one of a gradient of an admission pressure of the vacuum brake booster and an admission pressure level of the vacuum brake booster; and
        the vacuum level of the vacuum brake booster is at least approximately ascertained by considering: a) the number of brake operations within a specified time interval, and b) at least one of an intensity of the brake pedal operations, an ABS state variable, a rotational speed of the engine of the vehicle, an accelerator position, and a signal ensuring the function of a vacuum source.

10. A device for controlling a braking force of a braking system of a vehicle, the braking system having a vacuum brake booster and a vacuum source, comprising:
    a computer processor configured to:
        determine a correction factor for a threshold value as a function of one of a magnitude of a vacuum level and a vacuum gradient of the vacuum brake booster;
        record at least one signal characterizing an operation of a brake pedal by a driver of the vehicle;
        compare one of the signal characterizing the operation of the brake pedal by the driver of the vehicle and a variable derived from the signal characterizing the operation of the brake pedal to a threshold value; and
        trigger an automatic braking procedure if one of the signal characterizing the operation of the brake pedal and the variable derived from the signal exceeds the threshold value.

11. The device as recited in claim 10, wherein at least one sensor is provided for determining the vacuum level in at least one of the vacuum brake booster and a vacuum supply line, and wherein the at least one sensor is connected to the control unit in a signal-conducting manner.

12. The device as recited in claim 10, wherein the control unit is configured to approximately ascertain the vacuum level with the aid of operating variables correlated with the at least one of the vacuum level and the vacuum gradient.

13. The device as recited in claim 10, wherein the control unit is configured to:
    determine the threshold value as a function of at least one of the vacuum level and the vacuum gradient; and
    subsequently modify the determined threshold value by the correction factor.

14. The device as recited in claim 11, wherein a vacuum reservoir is provided for a rapid reconstitution of a maximum vacuum level in the vacuum brake booster, as a function of the determined vacuum level.

15. A device for controlling a braking force of a braking system of a vehicle, the braking system including a vacuum brake booster and a vacuum source, the device comprising:
   a sensor configured to record at least one of a number of brake pedal operations of a brake pedal in a specified time interval and an intensity of the brake pedal operations in the specified time interval; and
   a computer processor configured to:
      record at least one signal characterizing an operation of the brake pedal by a driver of the vehicle;
      compare one of the signal characterizing the operation of the brake pedal by the driver of the vehicle and a variable derived from the signal characterizing the operation of the brake pedal to a threshold value; and
      trigger an automatic braking procedure if the one of the signal characterizing the operation of the brake pedal and the variable derived from the signal exceeds the threshold value;
   wherein the threshold value is specified by the control unit at least partially as a function of at least one of a vacuum level and a vacuum gradient of the vacuum brake booster.

16. The device as recited in claim 15, wherein the vacuum level of the vacuum brake booster is at least approximately ascertained by considering: a) the number of brake operations within a specified time interval, and b) at least one of an intensity of the brake pedal operations.

* * * * *

UNITED STATES PATENT AND TRADEMARK OFFICE
CERTIFICATE OF CORRECTION

PATENT NO. : 8,457,851 B2
APPLICATION NO. : 12/225651
DATED : June 4, 2013
INVENTOR(S) : Epple et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1280 days.

Signed and Sealed this
Eighth Day of September, 2015

Michelle K. Lee
*Director of the United States Patent and Trademark Office*